(12) United States Patent
Ma et al.

(10) Patent No.: US 7,690,030 B1
(45) Date of Patent: *Mar. 30, 2010

(54) ELECTRONIC DATA FLASH CARD WITH FINGERPRINT VERIFICATION CAPABILITY

(75) Inventors: Abraham C. Ma, Fremont, CA (US); Sun-Teck See, San Jose, CA (US); Charles C. Lee, Cupertino, CA (US); Edward W. Lee, Mountain View, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 869 days.

This patent is subject to a terminal disclaimer.

(21) Appl. No.: 11/458,987

(22) Filed: Jul. 20, 2006

Related U.S. Application Data

(63) Continuation-in-part of application No. 09/478,720, filed on Jan. 6, 2000, now Pat. No. 7,257,714, and a continuation-in-part of application No. 10/761,853, filed on Jan. 20, 2004, now abandoned.

(51) Int. Cl.
*G06F 7/04* (2006.01)
(52) U.S. Cl. .......................... 726/9; 713/172
(58) Field of Classification Search ................ 713/167, 713/185, 186, 189, 193, 172; 380/115, 116, 380/217; 726/9, 20; 711/100, 115, 170
See application file for complete search history.

(56) References Cited

U.S. PATENT DOCUMENTS

| 5,623,552 | A | | 4/1997 | Lane |
|---|---|---|---|---|
| 5,959,541 | A | | 9/1999 | DiMaria et al. |
| 6,012,636 | A | * | 1/2000 | Smith ......................... 235/380 |
| 6,069,920 | A | | 5/2000 | Schulz et al. |
| 6,125,192 | A | * | 9/2000 | Bjorn et al. .................. 382/124 |
| 6,193,152 | B1 | | 2/2001 | Fernando et al. |
| 6,321,478 | B1 | | 11/2001 | Klebes |
| 6,718,407 | B2 | | 4/2004 | Martwick |
| 6,886,104 | B1 | * | 4/2005 | McClurg et al. ............. 713/300 |
| 7,257,714 | B1 | * | 8/2007 | Shen ........................... 713/186 |
| 2001/0043174 | A1 | | 11/2001 | Jacobsen et al. |
| 2002/0166023 | A1 | | 11/2002 | Nolan et al. |
| 2003/0046510 | A1 | | 3/2003 | North |
| 2003/0163656 | A1 | | 8/2003 | Ganton |
| 2004/0148482 | A1 | | 7/2004 | Grundy et al. |
| 2004/0255054 | A1 | | 12/2004 | Pua et al. |

\* cited by examiner

*Primary Examiner*—Beemnet W Dada
(74) *Attorney, Agent, or Firm*—Bever, Hoffman & Harms, LLP; Patrick T. Bever

(57) ABSTRACT

An electronic data flash card with fingerprint capability is accessible by an host computer, and includes a processing unit connected to a flash memory device that stores a data file and reference fingerprint data of a person authorized to access the data file, a fingerprint sensor for scanning the fingerprint of a user and for generating input fingerprint data that can be compared with the stored reference fingerprint data, and an input-output interface circuit activated so as to establish a communication with the host computer. In an embodiment, the electronic data flash card uses a USB input/output interface circuit for communication with the host computer.

4 Claims, 4 Drawing Sheets

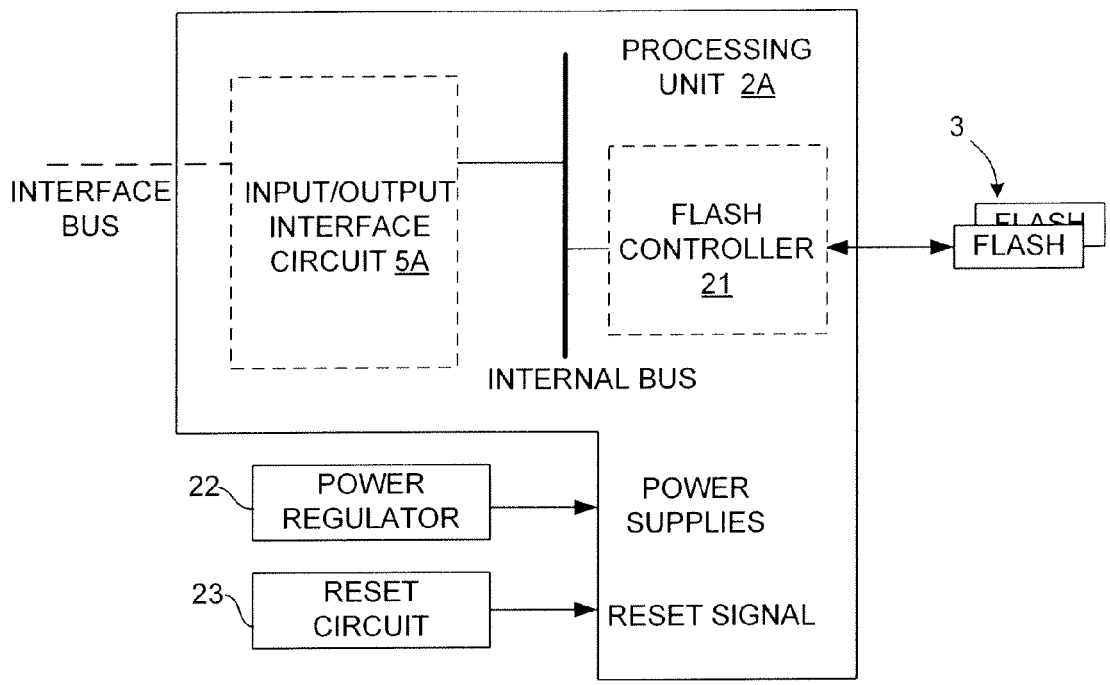
FIG. 3
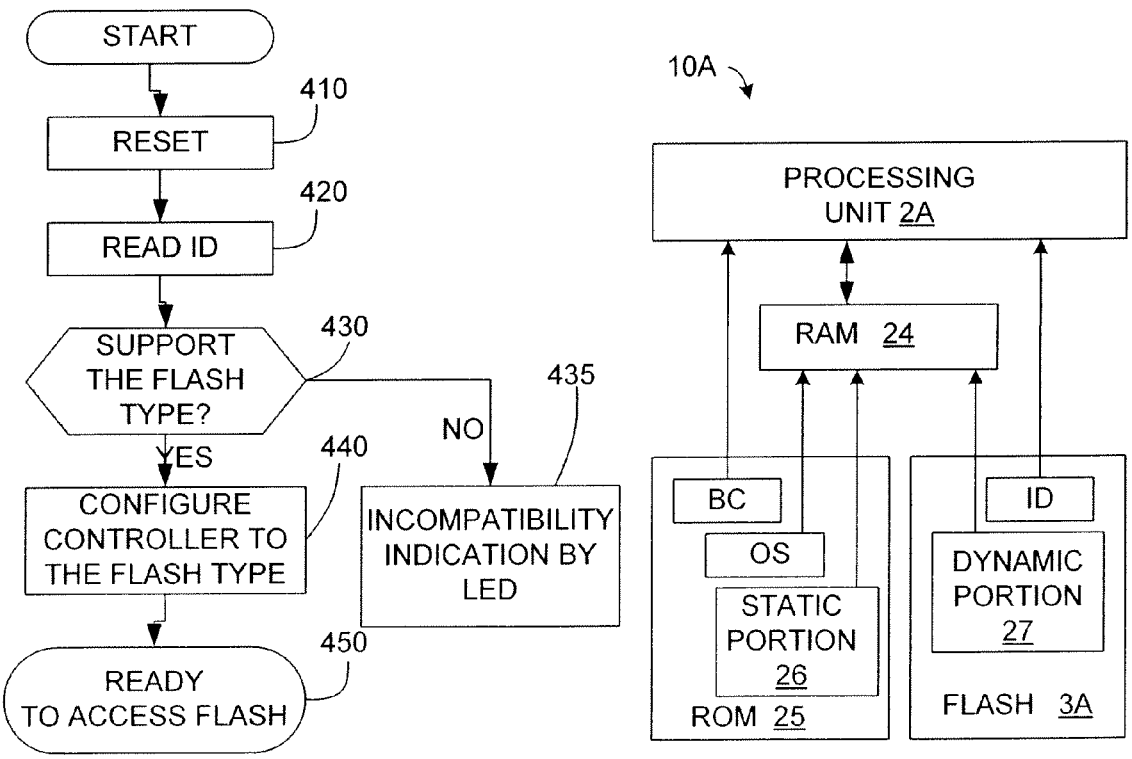
FIG. 4A     FIG. 4B

ELECTRONIC DATA FLASH CARD WITH FINGERPRINT VERIFICATION CAPABILITY

RELATED APPLICATIONS

This application is a continuation-in-part of U.S. Patent application for "ELECTRONIC DATA STORAGE MEDIUM WITH FINGERPRINT VERIFICATION CAPABILITY", U.S. application Ser. No. 09/478,720, filed Jan. 6, 2000, and a continuation-in-part of U.S. Patent application for "HIGHLY INTEGRATED MASS STORAGE DEVICE WITH AN INTELLIGENT FLASH CONTROLLER", U.S. application Ser. No. 10/761,853, filed Jan. 20, 2004.

FIELD OF THE INVENTION

The invention relates to electronic data storage cards, more particularly to an electronic data flash card with fingerprint verification capability.

BACKGROUND OF THE INVENTION

Confidential data files are often stored in floppy disks or are delivered via networks that require passwords or that use encryption coding for security. Confidential documents are sent by adding safety seals and impressions during delivery. However, confidential data files and documents are exposed to the danger that the passwords, encryption codes, safety seals and impressions may be broken (deciphered), thereby resulting in unauthorized access to the confidential information. Flash memory has significant advantages over floppy disks or magnetic hard disks such as having high-G resistance and low power dissipation. Because of the smaller physical size of flash memory, they are also more conducive to mobile systems. Also, advances in flash technology have created a greater variety of flash memory device types that vary for reasons of performance, cost and capacity.

Accordingly, what is needed is an electronic data flash card with security protection that includes an intelligent processing unit for security and for flexible flash memory type support. A general purpose electronic data flash card without security protection can also be benefited by an intelligent processing unit.

SUMMARY OF THE INVENTION

In accordance with an embodiment of the present invention, an electronic data flash card is provided with fingerprint verification capability for security during the transfer of confidential data file information. The electronic data flash card includes a flash memory device, a fingerprint sensor, an input-output interface circuit and a processing unit. The electronic data flash card is adapted to be accessed by a host (external) computer such as a personal computer, notebook computer or other electronic host device. As an electronic data flash card with fingerprint capability is easier to carry and durable for ruggedness, a personal data can be stored inside flash memory device encrypted together with fingerprint sensor associated with card body to make sure unauthorized person cannot misuse the card.

In accordance with an embodiment of the invention, the electronic data flash card with fingerprint verification capability utilizes fingerprint data stored in the flash memory device to verify the authenticity of a user. The flash memory device stores a confidential data file and reference fingerprint data obtained by scanning a fingerprint of a person authorized to access the data file during a programming mode. The fingerprint sensor is adapted to scan a fingerprint of a user of the electronic data flash card and to generate fingerprint scan data during normal operation. One example of the fingerprint sensor that can be used in the present invention is that disclosed in co-owned U.S. Pat. No. 6,547,130, entitled "INTEGRATED CIRCUIT CARD WITH FINGERPRINT VERIFICATION CAPABILITY", which is incorporated herein by reference in its entirety. The fingerprint sensor described in the above patent that includes an array of scan cells (M×N) that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

In accordance with an aspect of the invention, a flash memory controller is part of the processing unit to control the operation of the flash memory device. The processing unit is connected to the flash memory device, the fingerprint sensor and the input/output interface circuit. The flash memory controller logic includes a flash type algorithm for detecting whether the flash memory device is of a flash type that is supported by the flash memory controller logic. By storing the dynamic portion of the flash detection algorithm code along with the confidential data in at least one flash memory device, not only can the ROM size of the electronic data flash card be reduced, but new flash types can be supported without hardware alteration simply by changing the dynamic portion of the flash detection algorithm stored in the flash memory. The overall cost is reduced and the unnecessary development time is also eliminated.

In accordance with another embodiment of the present invention, the processing unit of an electronic data flash card is operable selectively in a programming mode, a data retrieving mode, and a resetting mode. When the processing unit is in the programming mode, the processing unit activates the input/output interface circuit to receive the confidential data file (and reference fingerprint data, when a fingerprint sensor is used) from the host computer, and to store the data file (and the reference fingerprint data) in the flash memory device. When the processing unit is in the data retrieving mode, the processing unit activates the input/output interface circuit to transmit the data file to the host computer. When fingerprint security is used, before activating the input/output interface circuit, the processing unit receives the fingerprint scan data from the fingerprint sensor, compares the fingerprint scan data with the reference fingerprint data stored in the flash memory device to verify if the user of the electronic data flash card with fingerprint verification capability is authorized to access the data file stored in the memory device. In the data resetting mode, the data file (and the reference fingerprint data) is/are erased from the flash memory device.

In one embodiment, the processing unit is a microprocessor including one of an 8051, 8032, 80286, RISC, ARM, MIPS or digital signal processor.

In accordance with an embodiment of the present invention, the input/output (I/O) interface circuit is a USB interface circuit. There are four types of USB software communication data flow between a host computer and the USB interface circuit of the flash memory device (also referred to as a "USB device" below): control, interrupt, bulk, and isochronous. Control transfer is the data flow over the control pipe from the host computer to the USB device to provide configuration and control information to a USB device. Interrupt transfers are small-data, non-periodic, low-frequency, guaranteed-latency, device-initiated communication typically used to notify the host computer of service needed by the USB device. Movement of large blocks of data across the USB interface circuit that is not time critical relies on Bulk transfers. Isochronous transfers are used when working with isochronous data. Isochronous transfers provide periodic, continuous communication between the host computer and the USB device. There are two data transfer protocols generally supported by USB interface circuits: Control/Bulk/Interrupt (CBI) protocol and Bulk-Only Transfer (BOT) protocol. The mass storage class CBI transport specification is approved for use with full-speed floppy disk drives, but is not used in high-speed capable devices, or in devices other than floppy disk drives (according to USB specifications). In accordance with an embodiment of the present invention, a USB flash device transfers high-speed data between computers using only the Bulk-Only Transfer (BOT) protocol. BOT is a more efficient and faster transfer protocol than CBI protocol because BOT transport of command, data, status rely on Bulk endpoints in addition to default Control endpoints.

BRIEF DESCRIPTION OF THE DRAWING

Other features and advantages of the present invention will become apparent in the following detailed description of the preferred embodiment with reference to the accompanying drawings, of which:

FIG. 3 is a block diagram of a processing unit utilized in an electronic data flash card in accordance with another embodiment of the present invention.

FIG. 4A is a flow chart showing a process for detecting a flash memory type in accordance with an embodiment of the present invention.

FIG. 4B is a block diagram showing a portion of an electronic data flash card according to another embodiment of the present invention.

DETAILED DESCRIPTION

Figure 1:
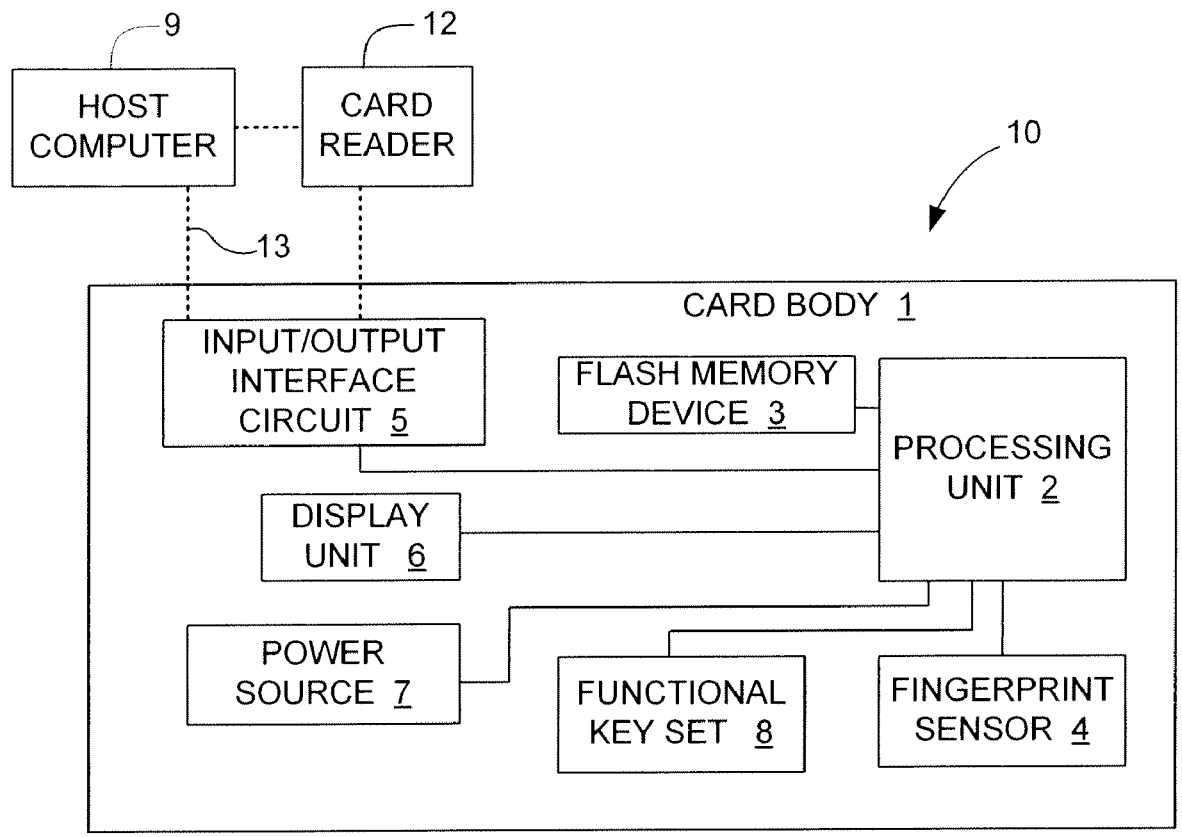
FIG. 1 is a block diagram showing an electronic data flash card with fingerprint verification capability in accordance with an embodiment of the present invention.

Referring to FIG. 1, according to an embodiment of the present invention, an electronic data flash card 10 is adapted to be accessed by an external (host) computer 9 either via an interface bus 13 or a card reader 12 or other interface mechanism (not shown), and includes a card body 1, a processing unit 2, one or more flash memory devices 3, a fingerprint sensor 4, an input/output interface circuit 5, an optional display unit 6, an optional power source (e.g., battery) 7, and an optional function key set 8.

Flash memory device 3 is mounted on the card body 1, stores in a known manner therein one or more data files, a reference password, and the reference fingerprint data obtained by scanning a fingerprint of one or more authorized users of the electronic data flash card 10. Only authorized users can access the stored data files. The data file can be a picture file or a text file.

The fingerprint sensor 4 is mounted on the card body 1, and is adapted to scan a fingerprint of a user of electronic data flash card 10 to generate fingerprint scan data. One example of the fingerprint sensor 4 that can be used in the present invention is that disclosed in a co-owned U.S. Pat. No. 6,547,130, entitled "INTEGRATED CIRCUIT CARD WITH FINGERPRINT VERIFICATION CAPABILITY", the entire disclosure of which is incorporated herein by reference. The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

The input/output interface circuit 5 is mounted on the card body 1, and can be activated so as to establish communication with the host computer 9 by way of an appropriate socket via an interface bus 13 or a card reader 12. In one embodiment, input/output interface circuit 5 includes circuits and control logic associated with a Universal Serial Bus (USB), PCMCIA or RS232 interface structure that is connectable to an associated socket connected to or mounted on the host computer 9. In another embodiment, the input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with the host computer 9 via an interface bus 13 or a card reader 12.

The processing unit 2 is mounted on the card body 1, and is connected to the flash memory device 3, the fingerprint sensor 4 and the input/output interface circuit 5 by way of associated conductive traces or wires disposed on card body 1. In one embodiment, processing unit 2 is one of an 8051, 8052, 80286 microprocessors available, for example, from Intel Corporation. In other embodiments, processing unit 2 includes a RISC, ARM, MIPS or other digital signal processors (DSP). In accordance with an aspect of the present invention, processing unit 2 is controlled by a program stored at least partially in flash memory device 3 such that processing unit 2 is operable selectively in: (1) a programming mode, where the processing unit 2 activates the input/output interface circuit 5 to receive the data file and the reference fingerprint data from the host computer 9, and to store the data file and the reference fingerprint data in flash memory device 3; (2) a data retrieving mode, where the processing unit 2 activates the input/output interface circuit 5 to transmit the data file stored in flash memory device 3 to the host computer 9; and (3) a data resetting mode, where the data file and the reference finger data are erased from the flash memory device 3. In operation, host computer 9 sends write and read requests to electronic data flash card 10 via interface bus 13 or a card reader 12 and input/output interface circuit 5 to the processing unit 2, which in turn utilizes a flash memory controller (not shown) to read from or write to the associated one or more flash memory devices 3. In one embodiment, for further security protection, the processing unit 2 automatically initiates operation in the data resetting mode upon detecting that a preset time period has elapsed since the last authorized access of the data file stored in the flash memory device 3.

The optional power source 7 is mounted on the card body 1, and is connected to the processing unit 2 and other associated units on card body 1 for supplying electrical power thereto.

The optional function key set 8, which is mounted on the card body 1, is connected to the processing unit 2, and is operable so as to initiate operation of processing unit 2 in a selected one of the programming, data retrieving and data resetting modes. The function key set 8 is operable to provide an input password to the processing unit 2. The processing unit 2 compares the input password with the reference password stored in the flash memory device 3, and initiates authorized operation of electronic data flash card 10 upon verifying that the input password corresponds with the reference password.

The optional display unit 6 is mounted on the card body 1, and is connected to and controlled by the processing unit 2 for showing the data file exchanged with the host computer 9 and for displaying the operating status of the electronic data flash card 10.

The following are some of the advantages of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in enhanced security.

Additional features and advantages of the present invention are set forth below.

Figure 2:
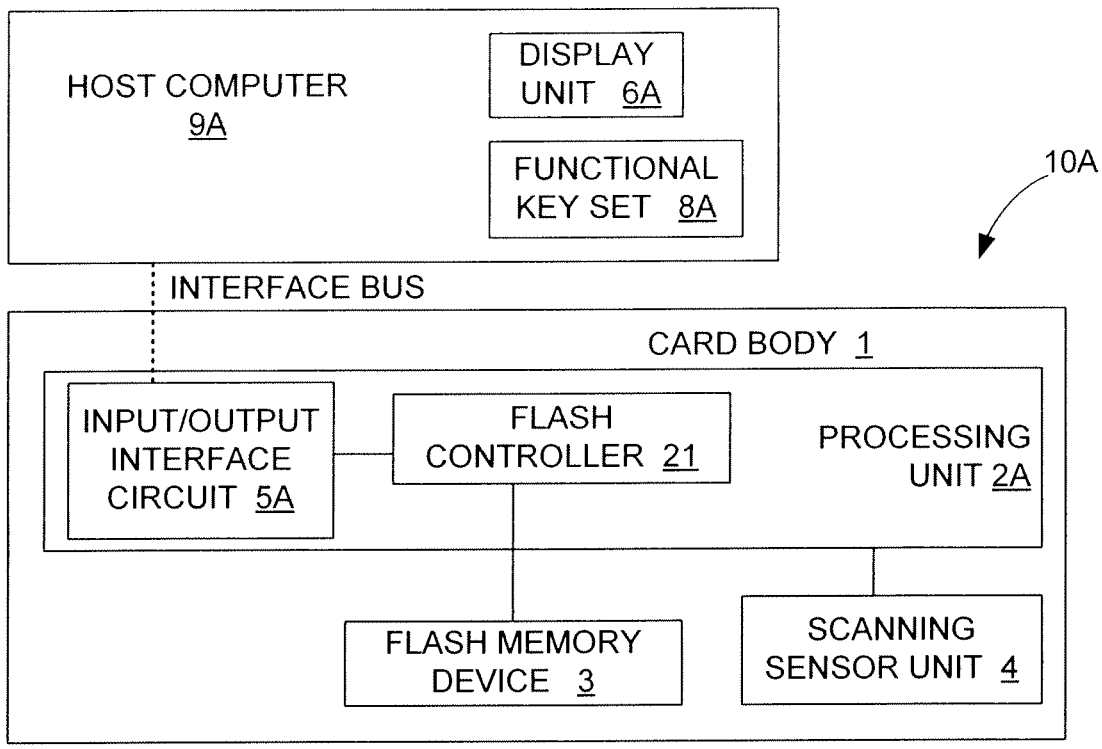
FIG. 2 is a schematic circuit block diagram illustrating an electronic data flash card with fingerprint verification capability according to another embodiment of the present invention.

FIG. 2 is a block diagram of an electronic data flash card 10A in accordance with an alternative embodiment of the present invention. The electronic data flash card 10A includes a highly integrated processing unit 2A including an input/output interface circuit 5A and a flash memory controller 21 for integration cost reduction reasons. Input/output interface circuit 5A includes a transceiver block, a serial interface engine block, data buffers, registers and interrupt logic. Input/output interface circuit 5A is coupled to an internal bus to allow for the various elements of input/output interface circuit 5A to communicate with the elements of flash memory controller 21. Flash memory controller 21 includes a microprocessor unit, a ROM, a RAM, flash memory controller logic, error correction code logic, and general purpose input/output (GPIO) logic. In one embodiment, the GPIO logic is coupled to a plurality of LEDs for status indication such as power good, read/write flash activity, etc., and other I/O devices. Flash memory controller 21 is coupled to one or more flash memory devices 3.

In this embodiment, host computer 9A includes a function key set 8A, is connected to the processing unit 2A via an interface bus or a card reader when electronic data flash card 10A is in operation. Function key set 8A is used to selectively set electronic data flash card 10A in one of the programming, data retrieving and data resetting modes. The function key set 8A is also operable to provide an input password to the host computer 9A. The processing unit 2A compares the input password with the reference password stored in the flash memory device 3, and initiates authorized operation of electronic data flash card 10A upon verifying that the input password corresponds with the reference password.

Also in this embodiment, a host computer 9A includes display unit 6A, is connected to the processing unit 2A when electronic data flash card 10A is in operation via an interface bus or a card reader. Display unit 6A is used for showing the data file exchanged with the host computer 9A, and for showing the operating status of the electronic data flash card 10A.

FIG. 3 shows processing unit 2A in additional detail. Electronic data flash card 10A includes a power regulator 22 for providing one or more power supplies to processing unit 2A. The power supplies provide different voltages to associated units of electronic data flash card 10A according to the power requirements. Capacitors (not shown) may be required for power stability. Electronic data flash card 10A includes a reset circuit 23 for providing a reset signal to processing unit 2A. Upon power up, reset circuit 23 asserts reset signal to all units. After internal voltages reach a stable level, the reset signal is then de-asserted, and resisters and capacitors (not shown) are provided for adequate reset timing adjustment. Electronic data flash card 10A also includes a quartz crystal oscillator (not shown) to provide the fundamental frequency to a PLL within processing unit 2A.

In accordance with an embodiment of the invention, input/output interface circuit 5A, reset circuit 23, and power regulator 22 are integrated or partially integrated within processing unit 2A. The high integration substantially reduces the overall space needed, the complexity, and the cost of manufacturing.

Compactness and cost are key factors to removable devices such as the electronic data flash cards described herein. Modern IC packaging can integrate discrete IC components with different technology and material into one IC package. For example, the input/output interface circuit is analog and digital mixed circuitry, which can be integrated into the MCP (Multi-Chip Package) package with the processing unit. The reset circuit and power regulator are analog circuitry, which can also be integrated into the MCP (Multi-Chip Package) package with the processing unit.

The nature of mixed signal IC technology allows the hybrid integration of both analog and digital circuitry. Therefore, higher integration can be incorporated into the same die for processing unit 2A which includes input/output interface circuit 5A, flash memory controller 21, reset circuit 23 and power regulator 22.

In an alternative embodiment, a processing unit 2, input/output interface circuit 5, and power regulator 22 and a reset circuit 23 are integrated or partially integrated using Multi-Chip Package technology or mixed signal IC technology.

Advances in flash technology have created a greater variety of flash memory device types that vary for reasons of performance, cost and capacity. For example, Multi Level Cell (MLC) Flash memory devices have higher capacity than Single Level Cell (SLC) flash memory devices for the same form factor. AND or Super-AND flash memory have been created to circumvent intellectual property issues associated with NAND flash memory. Also, a large page size (2K Bytes) flash memory has better write performance against a small page size (512 Bytes) flash memory. Further, the rapid development of flash memory has resulted in devices with higher capacities. To support these various flash memory types, the flash memory controller must be able to detect and access them accordingly.

Due to the potential shortage, cost reason, the need for sourcing flexibility of flash memories, and the fact that unique control is required to access each different flash type, it is important to implement a processing unit with intelligent algorithm to detect and access the different flash memory device types.

Typical flash memory devices contains ID code which identifies the flash type, the manufacturer, and the features of the flash memory such as page size, block size organization, capacity, etc. In accordance with an embodiment of the present invention, the processing unit of an electronic data flash card performs a flash detection operation at system power up to determine whether the one or more flash memory devices of the electronic data flash card are supported by the existing flash memory controller.

FIG. 4A illustrates a flash detection algorithm in accordance with the present invention. First, the processing unit is reset (block 410). Next, the ID of the flash memory is read to identify the flash memory type (block 420). The read ID is then compared against the table of flash types that are supported by the existing flash memory controller (block 430). If the flash type is not supported (block 435), the flash memory controller will not be able to access the flash memory, and the incompatibility can be indicated by LED via an output port of the controller. If the flash type is supported, the flash memory controller will be configured to the access mode corresponding to that detected flash type (block 440), and then the flash memory controller begins accessing the flash memory (block 450).

Electronic data flash cards are flash memory systems using flash memories for data storage. For example, as indicated in FIG. 4B, electronic data flash card 10A includes processing unit 2A, flash memory 3A, random-access memory (RAM) 24, and read-only memory (ROM) 25, with the boot code (BC) and operating system (OS) code residing in ROM 25. Upon power up, processing unit 2A fetches and executes the boot code from ROM 25, which initializes the system components and loads the OS code from ROM 25 into RAM 24. Once the OS code is loaded into the RAM 24, it takes control of the system. The OS includes drivers to perform basic tasks such as controlling and allocating memory, prioritizing the processing of instructions, controlling input and output ports etc. The OS code also includes the flash detection algorithm code and the flash parametric data.

Because of the permanent nature of data stored in a ROM, after the flash memory controller of a conventional electronic data flash card is designed and put into production, the software in ROM is frozen and cannot be changed to support new flash types released to the market at a later time. In such a situation, the development of a new flash memory controller has to support new flash memories from time to time, which is costly and time consuming.

Referring again to FIG. 4B, in accordance with another embodiment of the present invention, electronic data flash card 10A includes a flash detection algorithm code that is separated into a static portion 26 and a dynamic portion 27, with the static portion 26 handling contemporary flash memories, and the dynamic portion 27 taking control of the detection process after the static portion fails to identify the particular flash memory device implemented in the electronic data flash card. That is, when electronic data flash card 10A is manufactured using an "old" type flash memory device, then the flash detection algorithm code recognizes the flash device ID during the power up process, and utilizes static portion 26 to execute read and write the "old" type flash memory device. Conversely, when a particular electronic data flash card having the novel configuration is manufactured using a "new" type flash memory device (e.g., 3A, shown in FIG. 4B), then the flash detection algorithm code recognizes the flash device ID during the power up process, and utilizes dynamic portion 27 to execute read and write operations to "new" type flash memory device 3A. With this configuration, static portion 26 of the flash detection algorithm code is stored in ROM 25, but dynamic portion 27 of the flash detection algorithm code is stored in at least one flash memory device 3A of electronic data flash card 10A. By storing dynamic portion 27 along with data (not shown) in at least one flash memory device 3A, not only can the size of ROM 25 be reduced, new flash types can be supported without hardware alteration. That is, if at some point the decision is made to implement a "new" flash memory type (i.e., that is not supported by the static portion), instead of having to replace the entire ROM, the process simply requires storing a suitable dynamic portion of the flash algorithm code in the one or more flash memory device. Because the default access and reading of the dynamic portion is already incorporated into execution of the flash detection algorithm code, the content of the dynamic portion can be altered without affecting operation of the flash detection algorithm code. Thus, overall manufacturing costs are reduced, and unnecessary development time is also eliminated.

Because data storing and reading in a flash memory device is necessary for access and verification purpose, speed is also a major concern of the device performance. According to additional aspects of the present embodiment set forth below, a method of dual-channel parallel and interleave access flash is implemented in an electronic data flash card for faster performance than is possible using conventional methods.

Figure 5A:
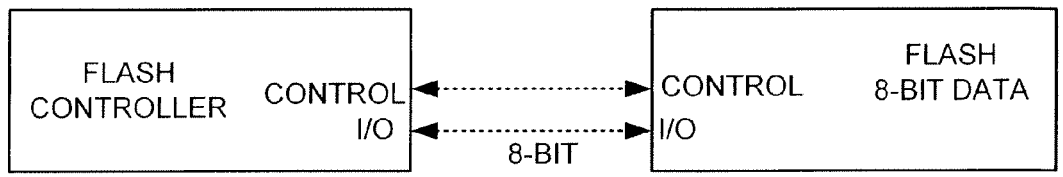
FIG. 5A is a block diagram illustrating an 8-bit access with 8-bit data flash memory.
Figure 5B:
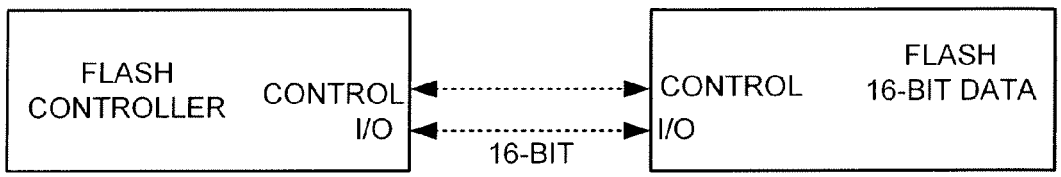
FIG. 5B is a block diagram illustrating a 16-bit access with 16-bit data flash memory.
Figure 5C:
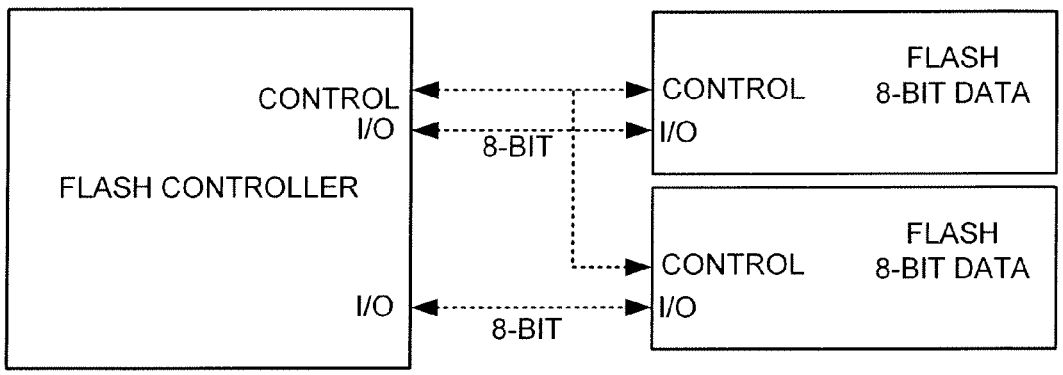
FIG. 5C is a block diagram illustrating a 16-bit dual channel access with two 8-bit data flash memories via a single control.

A typical electronic data flash card uses a flash memory with single-channel (8-bit) data bus, as shown in FIG. 5A. With multiple-channel data bus, more data bits can be read from or write to the flash memories simultaneously, thereby the access speed is enhanced. For example, dual-channel (16-bit) data bus can double the access speed to the flash memory, quad-channel (32-bit) data can increase the access speed by 4 times, and so on. Electronic data flash card with dual-channel data width can be realized by one 16-bit wide flash memory as illustrated in FIG. 5B, by two 8-bit wide flash memories via a single control as illustrated in FIG. 5C, or by two 8-bit wide flash memories via separate controls as illustrated in FIG. 5D.

Figure 5D:
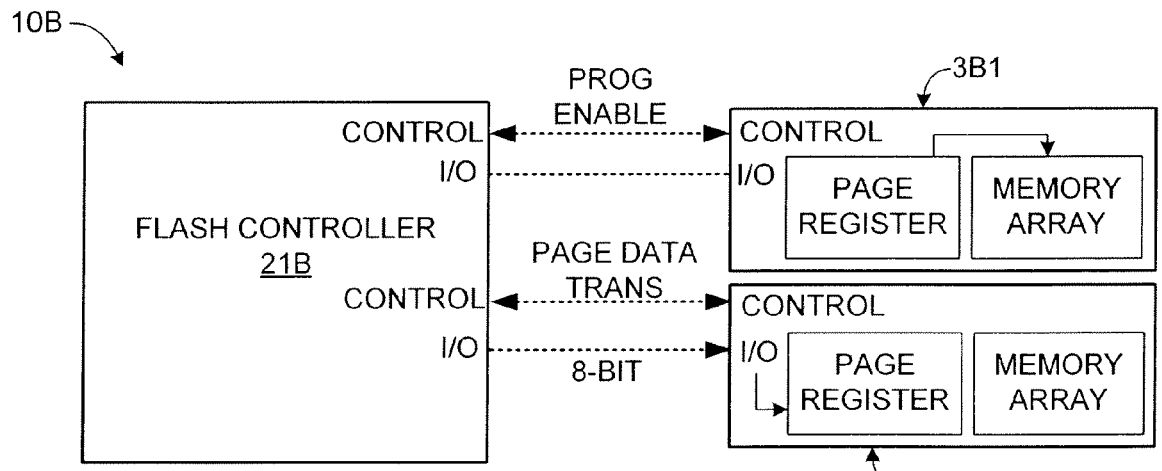
FIG. 5D is a block diagram illustrating a 16-bit interleave channel access with two 8-bit data flash memories via separate controls according to an embodiment of the present invention.

Electronic data flash card 10B, which is depicted in FIG. 5D, includes separate control and I/O connections for each flash memory device 3B1 and 3B2, thereby enabling interleaved programming that enhances system speed and avoids peak power consumption. Flash memory devices consume higher power in the programming (writing) mode, in which data is transferred from page register into the flash cells of the memory array, than in any other operating mode (e.g., reading data from the flash cells, or writing memory to the page register from an external source). In accordance with the present invention, interleaved programming of flash memory devices 3B1 and 3B2 involves "write staggering", wherein flash memory controller 21B enables one flash memory device (e.g., flash memory device 3B1) to program (write) data from its page register into its flash memory array while the other flash memory devices (e.g., flash memory device 3B2) are limited to non-programming operations (e.g., enabled to receive data from flash memory controller 21B to the page register (i.e., no writing is performed in flash memory device 3B2 while a write operation is being performed by flash memory device 3B1). This avoids operating multiple flash memories in programming mode at the same time, and increases the speed of flash memory access by allowing the throughput for access to each flash memory device 3B1 and 3B2 to match the speed of the host computer interface standard. In addition to enhancing access speed, this interleave access approach allows the system to avoid peak power consumption that can be caused by writing multiple flash devices at the same time.

Figure 6:
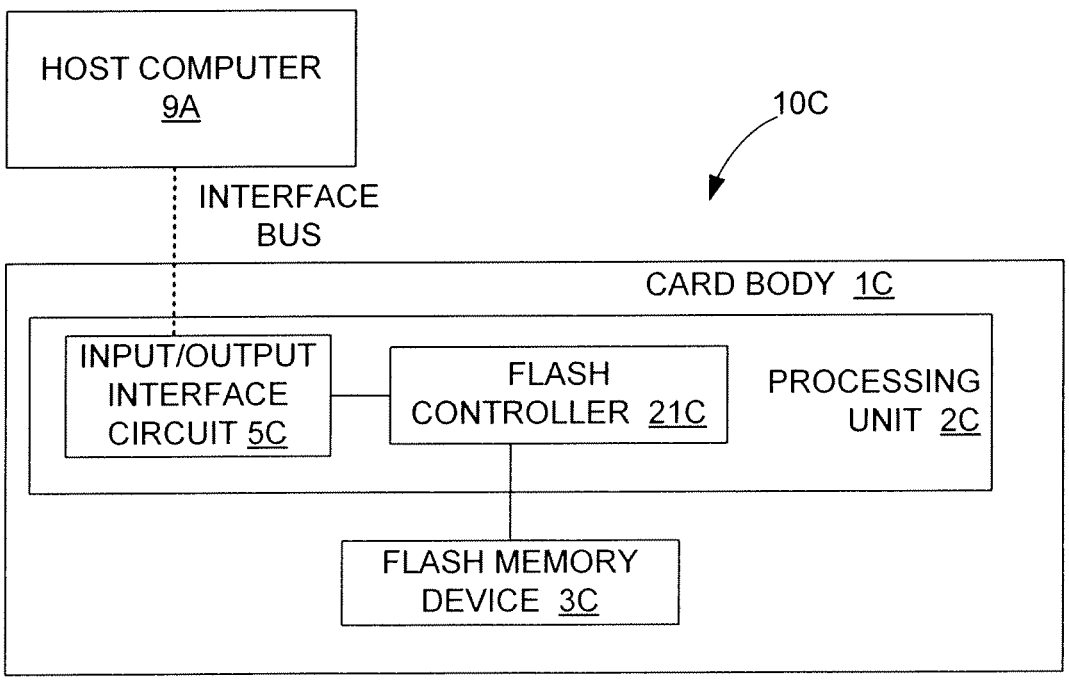
FIG. 6 is a schematic circuit block diagram illustrating an electronic data flash card according to another embodiment of the present invention.

The various novel aspects described above may be implemented together or independently while remaining within the spirit and scope of the present invention. For example, FIG. 6 shows an electronic data flash card (or electronic data storage medium, or integrated circuit card) 10C according to yet another embodiment of the present invention. Electronic data flash card 10C is adapted to be accessed by a host computer 9A via an interface bus or card reader (i.e., communication link), and includes a card body 1C, a processing unit 2C including a flash memory controller 21C and an input/output interface circuit 5C, and one or more flash memory devices 3C in according to one or more of the embodiments described above. Electronic data flash card 10C could be the functional subsystem for electronic data flash card with fingerprint verification capability 10A (described above), and also could be a functional subsystem for other applications.

Flash memory device 3C is controlled through commands generated by flash memory controller 21C, and stores a data file in the flash memory device.

Processing unit 2C is connected to flash memory device, said input/output interface circuit. Flash memory controller 21C inside processing unit 2C controls flash memory device 3C utilizing one or more of the methods described above. In one embodiment, flash memory controller 21C executes a flash type algorithm that determines if flash memory device 3C is supported by the static portion of the flash memory controller logic stored in ROM (not shown), and reads a dynamic portion of flash memory controller logic stored in flash memory device 3C if the flash type is "new".

According to another aspect, input/output interface circuit 5C is activated so as to establish USB Bulk Only Transport (BOT) communications with host computer 9A via the interface link. There are four types of USB software communication data flow between a host computer and the USB interface circuit of the flash memory device (also referred to as a "USB device" below): control, interrupt, bulk, and isochronous. Control transfer is the data flow over the control pipe from the host computer to the USB device to provide configuration and control information to a USB device. Interrupt transfers are small-data, non-periodic, guaranteed-latency, device-initiated communication typically used to notify the host computer of service needed by the USB device. Movement of large blocks of data across the USB interface circuit that is not time critical relies on Bulk transfers. Isochronous transfers are used when working with isochronous data. Isochronous transfers provide periodic, continuous communication between the host computer and the USB device. There are two data transfer protocols generally supported by USB interface circuits: Control/Bulk/Interrupt (CBI) protocol and Bulk-Only Transfer (BOT) protocol. The mass storage class CBI transport specification is approved for use with full-speed floppy disk drives, but is not used in high-speed capable devices, or in devices other than floppy disk drives (according to USB specifications). In accordance with an embodiment of the present invention, a USB flash device transfers high-speed data between computers using only the Bulk-Only Transfer (BOT) protocol. BOT is a more efficient and faster transfer protocol than CBI protocol because BOT transport of command, data, status rely on Bulk endpoints in addition to default Control endpoints.

As with previous embodiments described above, processing unit 2C is selectively operable in a programming mode, where processing unit 2C causes input/output interface circuit 5C to receive the data file from host computer 9A, and to store the data file in flash memory device 3C through write commands issued from host computer 9A to flash memory controller 21C, a data retrieving mode, where processing unit 2C receives the data in flash memory device 3C through read command issued from host computer 9A to flash memory controller 21C and to access the data file stored in flash memory device 3C, and activates input/output interface circuit 5C to transmit the data file to host computer 9A, and a data resetting mode where the data file is erased from flash memory device 3C.

Advantages of the intelligent processing unit 2C in accordance with the present invention include:

(1) providing high integration, which substantially reduces the overall space needed and reduces the complexity and the cost of manufacturing.

(2) utilizing an intelligent algorithm to detect and access the different flash types, which broadens the sourcing and the supply of flash memory;

(3) by storing the portion of software program along with data in flash memory which results in the cost of the controller being reduced; and (4) utilizing more advanced flash control logic which is implemented to raise the throughput for the flash memory access.

Although the present invention disclosed herein is described in the context of an electronic data flash card with or without fingerprint verification capability, the present invention may apply to other types of memory systems and still remain within the spirit and scope of the present invention.

We claim:

1. An electronic data flash card with fingerprint verification capability adapted to be accessed by a host computer that is capable of establishing a communication link, said electronic data flash card comprising:

a card body;

a flash memory device mounted on the card body for storing a data file, reference fingerprint data associated with a person authorized to access the data file, and a reference password;

a fingerprint sensor mounted on the card body and adapted to scan a fingerprint of a user of said electronic data flash card and to generate fingerprint scan data in accordance with the scanned fingerprint;

an input/output interface circuit mounted on card body for establishing communication with the host computer, wherein the input/output interface circuit includes a Universal Serial Bus (USB) interface circuit including means for transmitting said data file using a Bulk Only Transport (BOT) protocol; and a processing unit mounted on the card body and electrically connected to said flash memory device, said fingerprint sensor, and said input/output interface circuit, wherein the processing unit comprises:

(a) a flash memory controller including means for determining whether the flash memory device is supported by the processing unit in accordance with a flash detection algorithm code, (b) means for comparing the input password with the reference password, and for initiating authorized operation of said electronic data flash card upon verifying that the input password corresponds with the stored reference password, (c) means for comparing the input fingerprint data with the stored reference fingerprint data, and for initiating authorized operation of said electronic data flash card upon verifying that the input fingerprint data corresponds with the stored reference fingerprint data, and (d) means for operating in one of:

a programming mode in which said processing unit activates said input/output interface circuit to receive the data file and the reference fingerprint data from the host computer, and to store the data file and the reference fingerprint data in said flash memory device in response to standard USB BOT write commands issued from the host computer to the flash memory controller;

a data retrieving mode in which said processing unit receives standard USB BOT read commands issued from host computer to the flash memory controller, and activates said input/output interface circuit to transmit the data file to the host computer; and a data resetting mode in which the data file and the reference fingerprint data are erased from one or more memory blocks of the flash memory device, wherein said data resetting mode is initiated and performed automatically by said flash memory controller after receiving said standard USB BOT write command, and wherein the processing unit further comprises means for reading the flash detection algorithm code from said flash memory device mounted on the card body.

2. The electronic data flash card according to claim 1, wherein the one or more flash memory devices include a first flash memory device and a second flash memory device, and wherein the flash memory controller inside the processing unit includes means for supporting at least one of dual-channel parallel access and interleave access to the first flash memory device and the second flash memory device.

3. An electronic data flash card adapted to be accessed by a host computer that is capable of establishing a communication link, said electronic data flash card comprising:

a card body;

one or more flash memory devices mounted on the card body for storing a data file and a flash detection algorithm code;

an input/output interface circuit mounted on card body for establishing communication with the host computer, wherein the input/output interface circuit includes a Universal Serial Bus (USB) interface circuit including means for transmitting said data file using a Bulk Only Transport (BOT) protocol; and a processing unit mounted on the card body and electrically connected to said flash memory device and said input/output interface circuit, wherein the processing unit comprises:

(a) a flash memory controller including means for reading said flash detection algorithm code from said one or more flash memory devices, and for determining whether the flash memory device is supported by the processing unit in accordance with said flash detection algorithm code, and (b) means for operating in one of:

a programming mode in which said processing unit activates said input/output interface circuit to receive the data file from the host computer, and to store the data file in said flash memory device in response to standard USB BOT write commands issued from the host computer to the flash memory controller;

a data retrieving mode in which said processing unit receives standard USB BOT read commands issued from host computer to the flash memory controller, and activates said input/output interface circuit to transmit the data file to the host computer and a data resetting mode in which obsolete data is erased from one or more memory blocks of the flash memory device, wherein said data resetting mode is initiated and performed automatically by said flash memory controller after receiving said standard USB BOT write command.

4. The electronic data flash card according to claim 3, wherein the one or more flash memory devices include a first flash memory device and a second flash memory device, and wherein the flash memory controller inside the processing unit includes means for supporting at least one of dual-channel parallel access and interleave access to the first flash memory device and the second flash memory device.

* * * * *